United States Patent
Sumimoto

(10) Patent No.: US 7,529,261 B2
(45) Date of Patent: May 5, 2009

(54) DATA COMMUNICATIONS METHOD SELECTION BY DATA COMMUNICATION SYSTEM

(75) Inventor: Shinji Sumimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 11/120,963

(22) Filed: May 4, 2005

(65) Prior Publication Data

US 2005/0190703 A1  Sep. 1, 2005

Related U.S. Application Data

(63) Continuation of application No. PCT/JP03/00857, filed on Jan. 29, 2003.

(51) Int. Cl.
*H04L 12/28* (2006.01)
(52) U.S. Cl. .................................... 370/419
(58) Field of Classification Search ......... 370/216–225, 370/229–232, 235, 359, 419; 709/200, 212, 709/220–226, 232, 250
See application file for complete search history.

(56) References Cited

U.S. PATENT DOCUMENTS

| | | | | |
|---|---|---|---|---|
| 4,589,111 A | * | 5/1986 | Adachi | 714/748 |
| 5,412,782 A | * | 5/1995 | Hausman et al. | 709/250 |
| 5,541,853 A | * | 7/1996 | Croft | 709/212 |
| 6,397,316 B2 | * | 5/2002 | Fesas, Jr. | 711/200 |
| 6,600,721 B2 | * | 7/2003 | Edholm | 370/232 |
| 6,760,781 B1 | * | 7/2004 | Wang et al. | 709/250 |
| 6,874,036 B2 | * | 3/2005 | Rawson, III | 709/246 |
| 6,978,312 B2 | * | 12/2005 | Eydelman et al. | 709/235 |
| 7,184,400 B2 | * | 2/2007 | Andonov et al. | 370/230.1 |
| 7,327,674 B2 | * | 2/2008 | Eberle et al. | 370/230 |

FOREIGN PATENT DOCUMENTS

| | | |
|---|---|---|
| JP | 09-288631 | 11/1997 |
| JP | 2000-235536 | 8/2000 |

OTHER PUBLICATIONS

International Search Report issued May 20, 2003.

* cited by examiner

*Primary Examiner*—Dmitry Levitan
(74) *Attorney, Agent, or Firm*—Staas & Halsey LLP

(57) ABSTRACT

A data communications system for a computer system conducting network communications, wherein a communications method is selected and set for conducting the communications (transfer) using an NIC (hardware) 2 or a host processor (CPU 4) based on communications data length, and furthermore, at this time, the free space status of the NIC memory 22 is determined, thereby the communications method as to whether, for example, data related to transmission is to be transferred to the NIC memory 22, or copied to the host memory 5, can be also appropriately determined.

6 Claims, 8 Drawing Sheets

FIG. 6

| DATA LENGTH | HOST CPU | NIC HARDWARE |
|---|---|---|
| 4 | a1 | b1 |
| 32 | a2 | b2 |
| 256 | a3 | b3 |
| 1024 | a4 | b4 |

FIG. 7

|  | FREE | TIME |
|---|---|---|
| NIC MEMORY | c1 | t1 |
| HOST MEMORY | c2 | t2 |

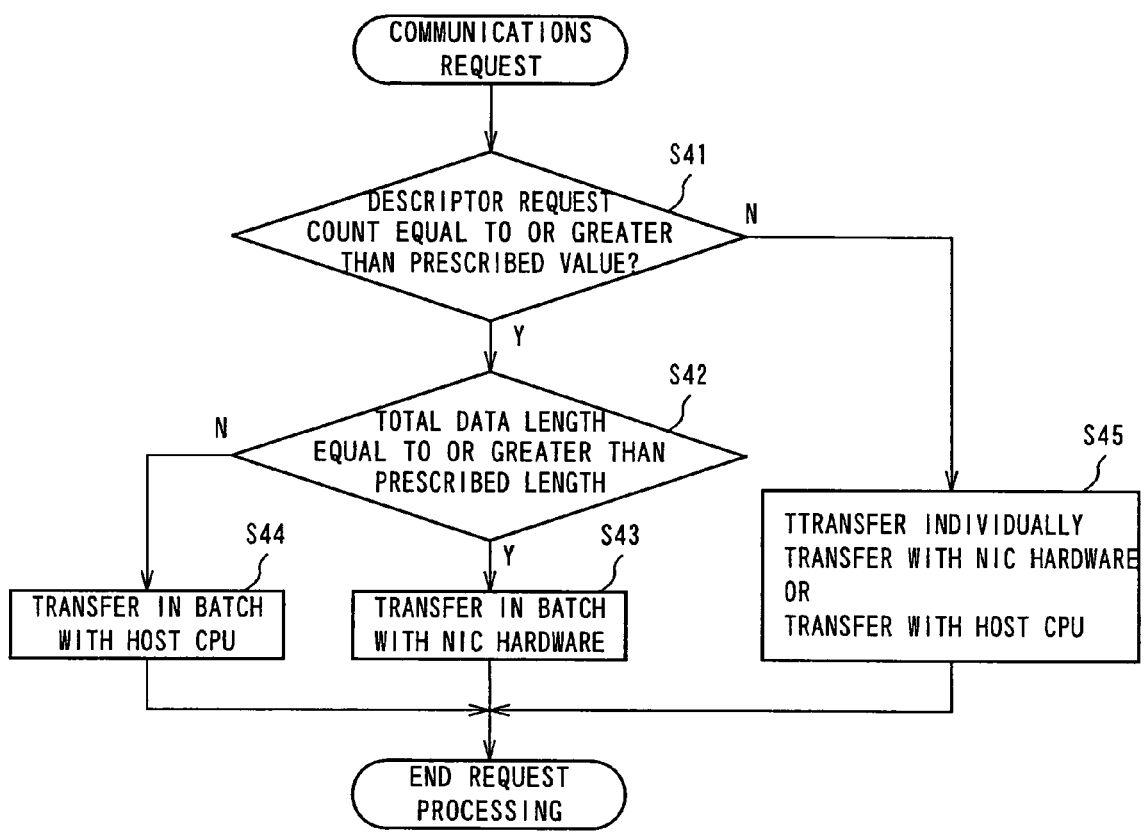

DATA COMMUNICATIONS METHOD SELECTION BY DATA COMMUNICATION SYSTEM

CROSS REFERENCE TO RELATED APPLICATIONS

This is a continuing application, filed under 35 U.S.C. §111(a), of International Application PCT/JP03/00857, filed Jan. 29, 2003.

TECHNICAL FIELD

The present invention relates to a data communications system, a data communications method, and a data communications program capable of selecting a communications method based on the environment of the computer when transferring internal data of a computer to the outside, or when receiving external data into a computer.

BACKGROUND ART

Dramatic improvements in processor performance and network performance have occurred in recent years. Improvements in network performance have been particularly dramatic, and communications processing with processors, and communications processing restricting copying of data have become necessary to extract maximum network hardware performance. However, the question of which method obtains the most efficiency is affected by the processing capacity of the processor, the transmission capacity of the system bus, the transmission capacity of the memory bandwidth, and the transmission capacity of the I/O bus and the like, and therefore these [factors] must be considered in total.

With conventional network communications software, the optimum communications processing method differed with the combination of network characteristics and system software. Thus, software was provided in which specifications for hardware and communications procedures are optimized for a specific network, and changes in the appropriate communications software and hardware processing method in response to differences in software processing performance and hardware performance were not considered.

Therefore, conventionally, in order to obtain maximum communications performance in a computer system employing a particular network, only a specific method optimized to the system (system hardware, network hardware, and operating system) is installed, or a plurality of methods are installed requiring a specific method, or optimizing of parameters, for each computer system. Thus, a communications method cannot be appropriately selected automatically in response to the computer environment, and therefore a constantly optimized communications method cannot be employed, and highly efficient communications cannot be conducted.

An object of the present invention is to resolve such problems, and to provide automatic selection of a communications method in response to a variety of computer environments, and to obtain a system of data communication, a method of data communication, and a program for data communication able to increase the speed of communications and the speed of applications.

DISCLOSURE OF THE INVENTION

To achieve the afore-mentioned object, the present invention is a data communications system for a computer system conducting network communications, and is provided with a performance and status recognition section recognizing at least one of performance and status in relation to data communications of the computer system, and a communications method selection and execution section having a function to execute a plurality of differing communications methods, and setting and executing at least one of the afore-mentioned plurality of communications methods based on the performance and status according to the afore-mentioned performance and status recognition section. Each communications method can be executed by hardware or software.

In the embodiments of the present invention, the communications method selection and execution section is comprised of the communications control section 32 and the NIC control section 33.

Performance related to the afore-mentioned data communications includes data transmission performance of the I/O bus with the host processor (host CPU), and data transmission performance with the hardware of the network interface card (NIC).

Furthermore, statuses related to the afore-mentioned data communications include the length of data subject to a communications request. When data length is equal to or greater than the prescribed length, the afore-mentioned communications method selection and execution section transfers data with the hardware on the network interface card. In this case, the CPU on the network interface card can employ DMA (Direct Memory Access) to transfer data rapidly.

Furthermore, when the length of data subject to a communications request is not equal to or greater than the prescribed length, the communications method selection and execution section transfers data on the I/O bus using the host processor. A table of data lengths can be provided, and the communications method for the data length selected in accordance with the value in this table.

Furthermore, statuses related to the afore-mentioned data communications include the free space available in the network interface card memory for data subject to a communications request. When free space is recognized as available in the network interface card memory by the afore-mentioned performance and status recognition section, the communications method selection and execution section transfers the data subject to the afore-mentioned communications request directly to the memory on the network interface card.

Furthermore, statuses related to the afore-mentioned data communications include the free space available in the host memory, and in the network interface card memory, for data subject to a communications request. When no free space is recognized as available in the network interface card memory by the performance and status recognition section, and free space is recognized as available in the host memory, the afore-mentioned communications method selection and execution section copies the data subject to a communications request to the host memory.

Furthermore, statuses related to the afore-mentioned data communications include the free space available in the host memory, and the free space available in the host memory, for data subject to a communications request. When no free space is recognized as available in the network interface card memory by the performance and status recognition section, and free space is recognized as available in the host memory, the afore-mentioned communications method selection and execution section waits for execution of processing of the afore-mentioned communications request.

Furthermore, statuses related to the afore-mentioned data communications include the free space available in the network interface card for data subject to a communications request. When no free space is recognized as available in the network interface card memory by the performance and status recognition section, the afore-mentioned performance and status recognition section estimates the time for free space to become available, and sets the processing of the afore-mentioned communications request in the wait state for the estimated time until the free space becomes available.

Furthermore, when a buffer descriptor is used in data transmission between the network interface card and the host, the number of requests in the afore-mentioned buffer descriptor is included as a status related to the afore-mentioned data communications, and when the afore-mentioned number of requests is recognized as equal to or greater than the prescribed number by the afore-mentioned performance and status recognition section, the communications method selection and execution section transfers the data related to the request in a batch via the network interface card. In this case, when the afore-mentioned number of requests is recognized as not being equal to or greater than the prescribed number, the communications method selection and execution section transfers the data related to the request one data at a time with the network interface card.

Furthermore, the present invention is a data communications method for a computer system conducting network communications having a function to execute a plurality of differing communications methods, and has a recognition step in which at least one of performance and status related to data communications of the computer system is recognized, and a communications execution step in which at least one communications method of the afore-mentioned plurality of differing communications methods is set and executed based on the afore-mentioned recognized performance and status.

Furthermore, the present invention is a data communications program for causing a computer to execute a data communications method of a computer system conducting network communications and having a function to execute a plurality of differing communications methods, and has a recognition step in which at least one of performance and status related to data communications of the computer system is recognized, and a communications execution step in which at least one communications method of the afore-mentioned plurality of differing communications methods is set and executed based on the afore-mentioned recognized performance and status.

The afore-mentioned program can be recorded on media readable by the afore-mentioned computer. This recording media includes portable recording media such as CD-ROMs, flexible disks, DVDs, magneto-optical disks, and IC cards and the like, and databases maintained by computer programs, other computers and their databases, and online transmission media.

BRIEF DESCRIPTION OF THE DRAWINGS

FIG. 6 is a diagram showing the table of the hardware performance and status recognition section;

FIG. 7 is a diagram showing the table of the memory performance and status recognition section;

FIG. 10 is a flowchart showing operation of the third embodiment of the present invention; and FIG. 11 is the table of the descriptor request count recognition section of the third embodiment of the present invention.

BEST MODE FOR CARRYING OUT THE INVENTION

The embodiments of the present invention are described below in reference to the figures.

First Embodiment

Figure 1:
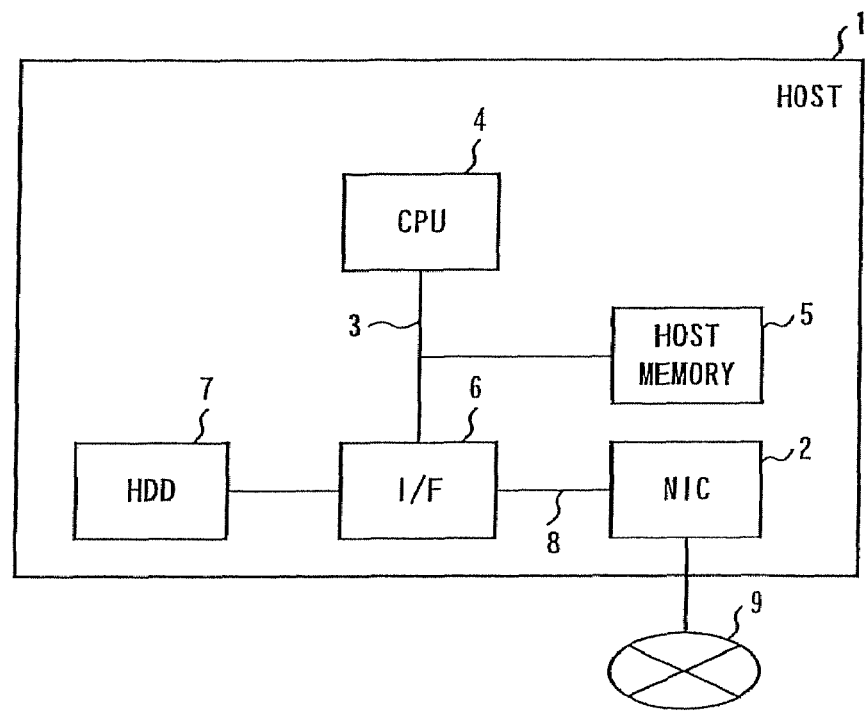
FIG. 1 is a hardware configuration diagram of the embodiments of the present invention.
Figure 2:
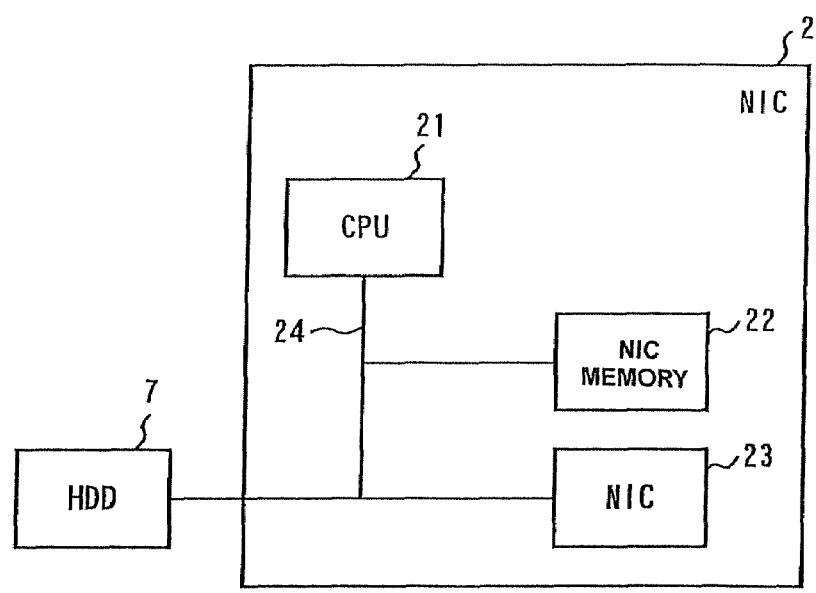
FIG. 2 is a hardware configuration diagram showing the NIC in the embodiments of the present invention.
Figure 3:
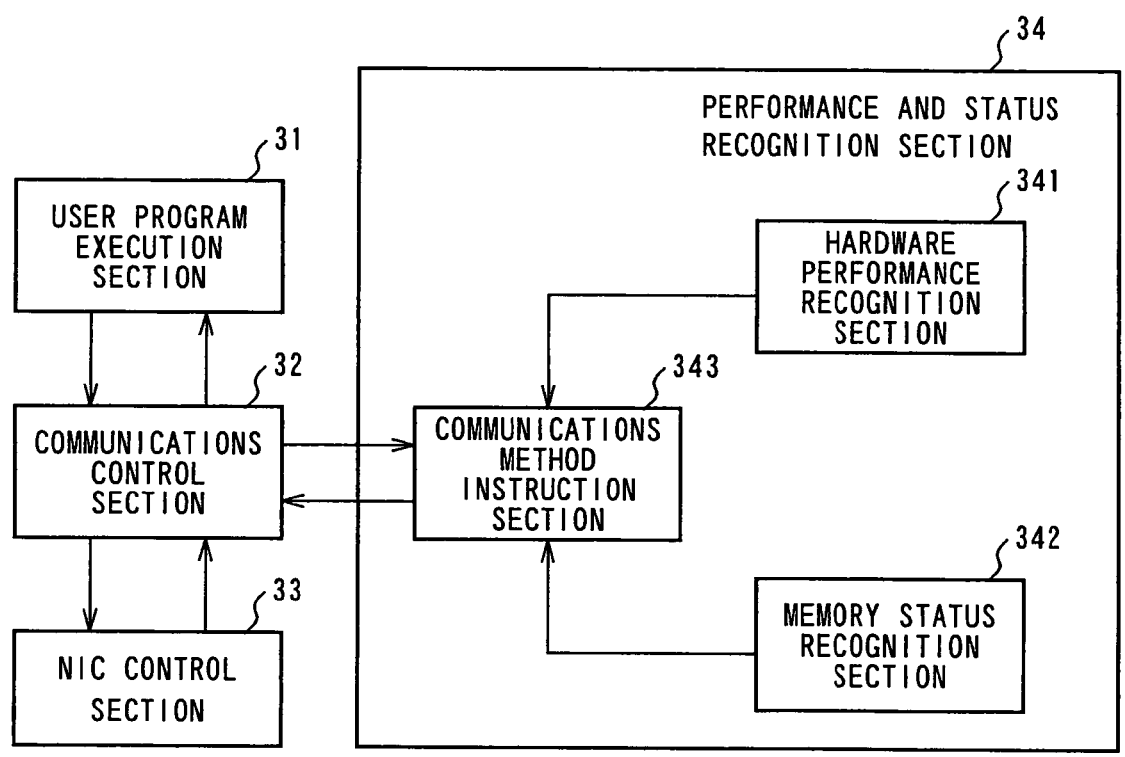
FIG. 3 is a software configuration diagram of the embodiments of the present invention.
Figure 4:
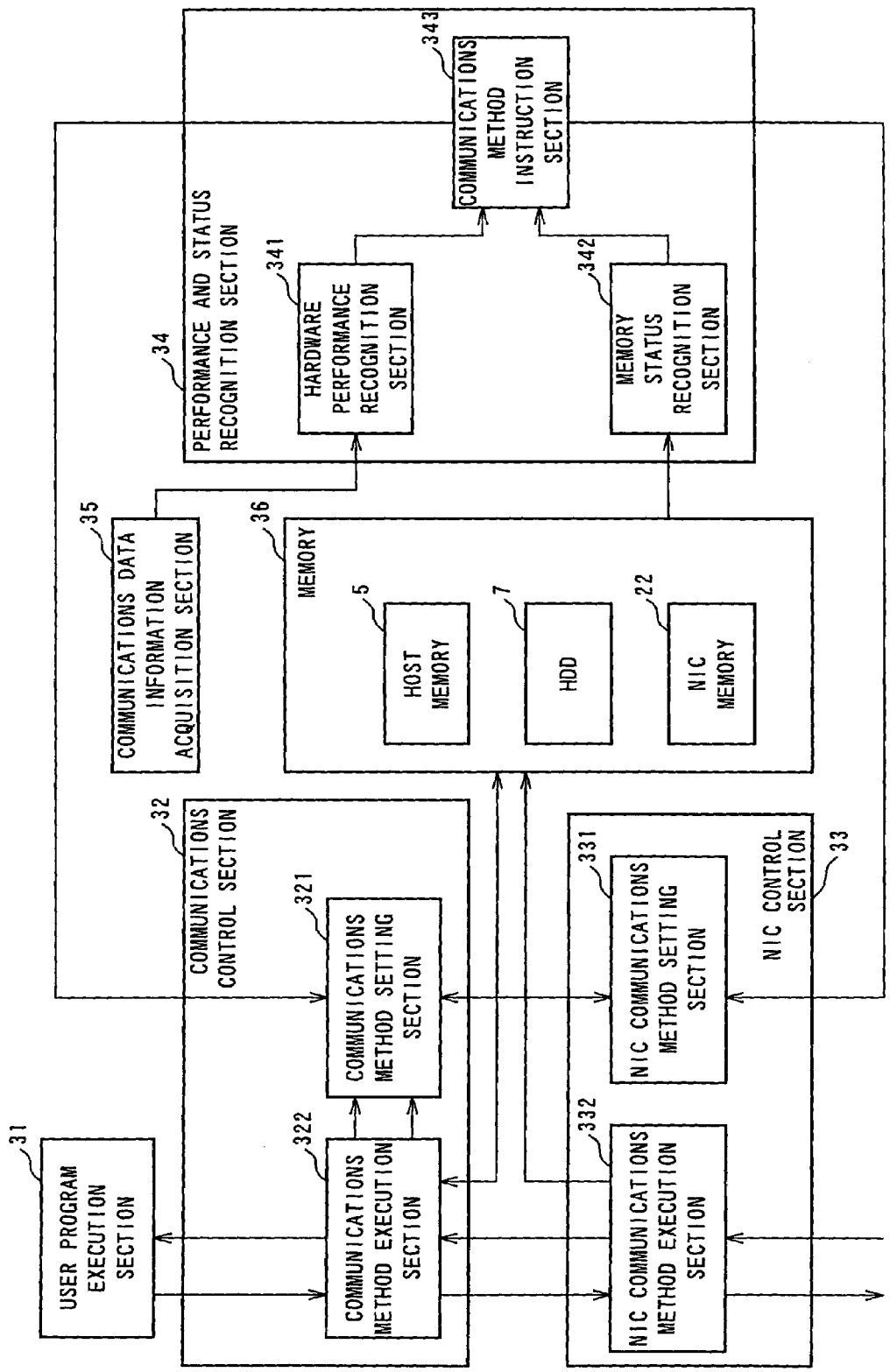
FIG. 4 is a function block diagram of the first embodiment of the present invention.

FIG. 1 is a basic hardware configuration diagram of the message communications system of the embodiments of the present invention, FIG. 2 is a configuration diagram showing the NIC, FIG. 3 is a software configuration diagram, FIG. 4 is a function block diagram of the first embodiment of the present invention.

As shown in FIG. 1, this message communications system has an NIC 2 in the host 1. The CPU (host processor) 4 and the host memory 5 are connected via the system bus 3 in the host 1, and the hard disk drive (HDD) 7 is connected via the interface (I/F) 6. The NIC 2 is connected to the network 9 via this interface 6 and I/O bus 8.

The NIC 2 is comprised of the NIC CPU 21, the NIC memory 22, and the network connection interface 23 mutually connected by the system bus 24.

Furthermore, as shown in FIG. 3, the software configuration of the message communications system can be comprised of a user program execution section 31, a communications control section (communications library section) 32, an NIC control section 33, and a performance and status recognition section 34. The performance and status recognition section 34 has a hardware performance recognition section 341 recognizing hardware performance, a memory status recognition section 342 recognizing the memory free space status, and a communications method instruction section 343 instructing and setting the communications function in the communications control section 32 based on the recognition results of 341 and 342.

Furthermore, in the function block diagram shown in FIG. 4, the communications control section 32 has a communications method setting section 321 setting the communications method instructed by the communications method instruction section 343, and a communications method execution section 322 executing the communications method set by the communications method setting section 321. Furthermore, the NIC control section 33 has an NIC communications method setting section (hereafter referred to as the 'communications method setting section') 331 setting the communications method instructed by the communications method instruction section 343, and an NIC communications method execution section (hereafter referred to as the 'communications method execution section') 332 executing the communications method set by the communications method setting section 331. This system has a communications data information acquisition section 35 acquiring information on communications data related to communications requests. The hardware performance recognition section 341 recognizes hardware performance in this system in relation to communications information (data length) from the communications data information acquisition section 35, the memory status recognition section 342 recognizes the memory status from the host memory 5 in the memory 36, the hard disk drive 7, and the NIC memory 22, and from other memories as necessary, and the communications method instruction section communications method instruction section 343 instructs the communications method to the communications control section 32 and the NIC control section NIC control section 33 based on these recognition results.

Figure 5:
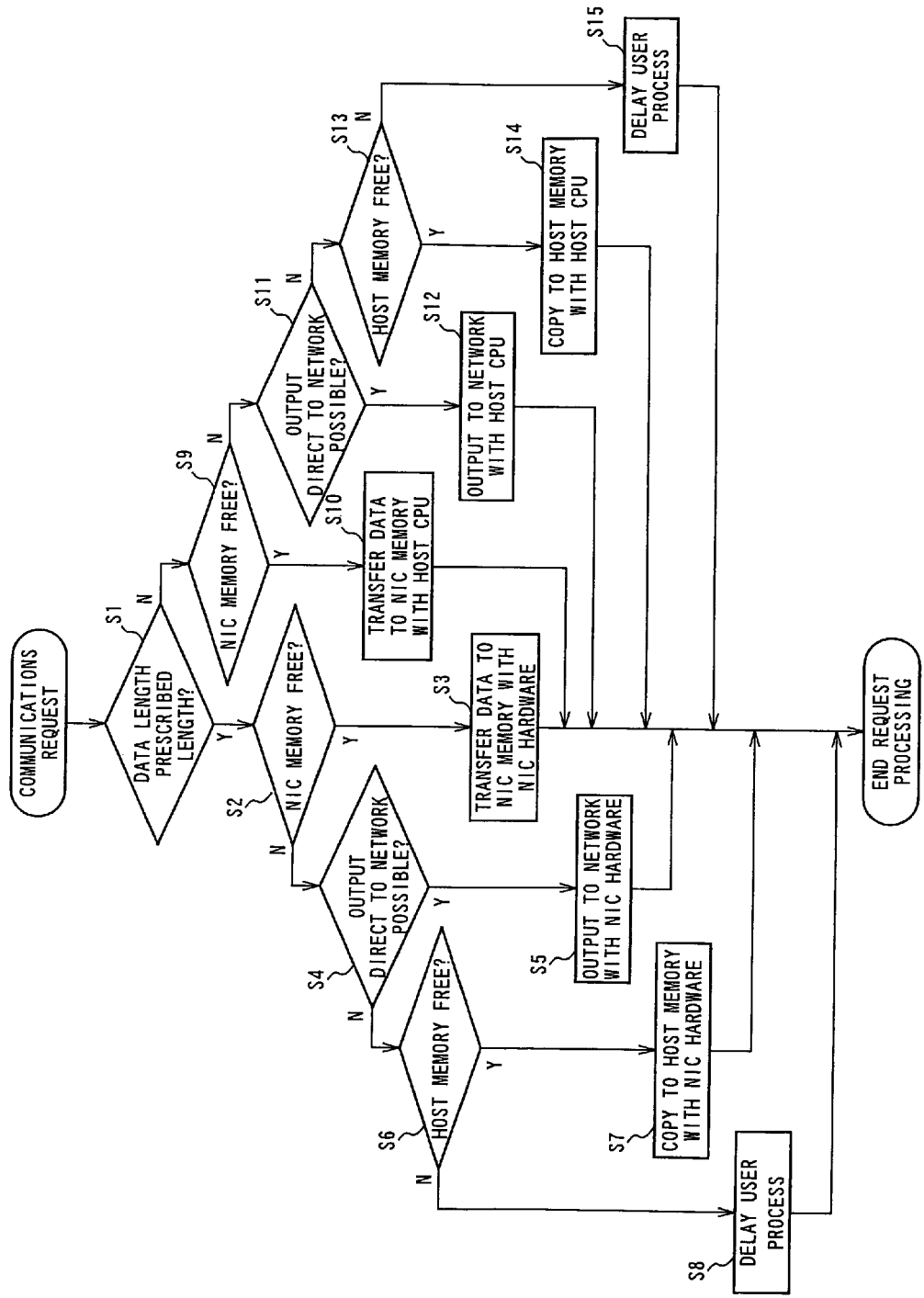
FIG. 5 is a flowchart showing operation during transmission in the first embodiment of the present invention.
Figure 8:
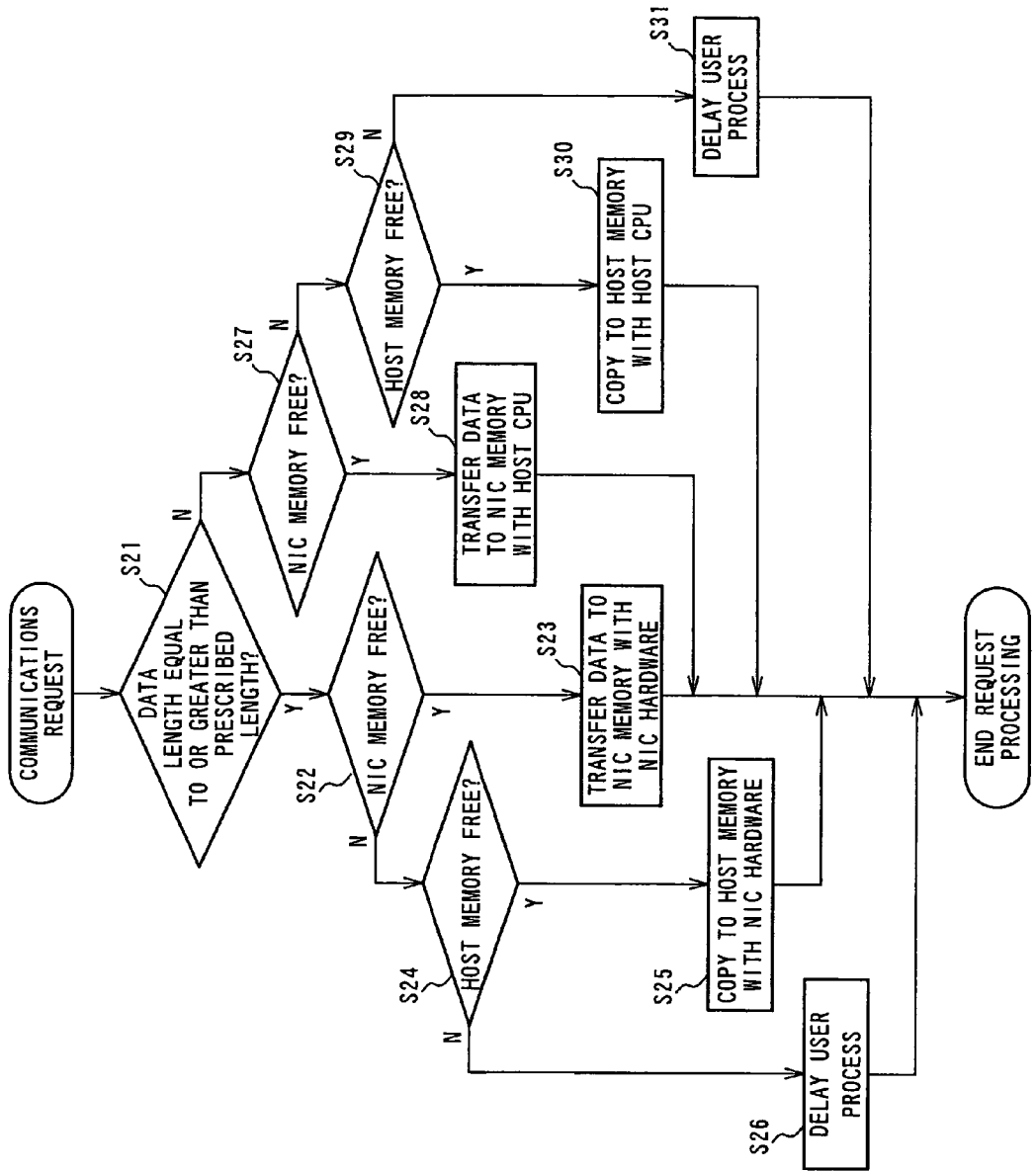
FIG. 8 is a flowchart showing operation during reception in the first embodiment of the present invention.

Operation of the first embodiment in the afore-mentioned configuration during transmission is described in reference to FIG. 5, and operation of the first embodiment in the afore-mentioned configuration during reception is described in reference to FIG. 8. The first embodiment compares I/O bus data transmission performance with the host processor (host CPU) with data transmission performance with the hardware of the NIC based on communications data length, and selects and sets the communications method as communication (transmission) conducted using the NIC 2, or communication using the host processor (CPU 4). Furthermore, at this time, free space of the NIC memory 22 is evaluated, and, for example, the appropriate decision on communications method made to move data related to transmission to the NIC memory 22, or copy it to the host memory 5.

A) At transmission: Data length equal to or greater than the prescribed length.

When a send data request is received from the user process (user program execution section 31), the communications data information acquisition section 35 acquires information on the data related to the send request, the hardware performance recognition section hardware performance recognition section 341 evaluates the data length acquired from the communications data information acquisition section 35, recognizes the hardware performance in relation to the data length, and outputs it to the communications method instruction section 343. Furthermore, the memory status recognition section 342 recognizes the memory status based on the free space of the host memory 5 and the free space of the NIC memory NIC memory 22, and outputs that free space status to the communications method instruction section communications method instruction section 343.

The hardware performance recognition section 341 has the table information as shown in FIG. 6. This table expresses the transmission performance (transmission time) of the host CPU 4, and the transmission performance (transmission time) of the NIC (hereafter referred to as 'NIC hardware') 2 in relation to the plurality of differing data lengths. The hardware performance recognition section 341 presents the approximate time required when data according to the send request is transferred using the CPU 4, and the approximate time required when it is transferred using the NIC, to the communications method instruction section 343 in accordance with this table. In this case, the hardware performance recognition section 341 may [be configured] so that it is able to present either method to the communications method instruction section 343 based on the time in the table (for example, that for which the time cost is less). When the length of data related to the communications request is equal to or greater than the prescribed length, since transmission using the NIC can be faster to transfer data, information on the prescribed data length to enable evaluation of whether or not the data related to the send request is equal to or greater than the prescribed data length may be stored, and when data of a length equal to or greater than the prescribed data length is sent, the hardware performance recognition section may present an instruction to the communications method instruction section so that data is generally sent (if possible) using NIC hardware in place of the table shown in FIG. 6.

Furthermore, the memory status recognition section 342 has a table shown in FIG. 7. This table stores the estimated time until free space necessary to store the data length for transmission is available for the case of free space being available and not available in the NIC memory 22, and the estimated time is acquired based on existing statistical data on time for free space to become available, or on current transmission speed if data is currently being sent.

As shown in FIG. 5, (1) the communications method instruction section 343 employs a function (method) to transfer data related to the communications request to the NIC memory 22 using the NIC hardware when data length is equal to or greater than the prescribed data length (S1, Y), and the NIC memory 22 is empty (S2, Y). This method is set in the communications method setting sections 321 and 331 of the communications control section 32 and NIC control section 33 respectively, and the communications method execution sections 322 and 332 execute that communications method (S3).

On the other hand, (2) when no free space is available for the data length in the NIC memory 22 (S2, N), for example, when data is in the host memory 5 and the like and can be output directly to the network (S4, Y), a function (method) to output directly from the interface to the network using the NIC hardware may be employed (S5), or (3) when no free space is available in the NIC memory (S2, N), or when the afore-mentioned function is employed, and the output line to the network is in use and the like, and direct output to the network is not possible (S4, N), the communications method instruction section 343 evaluates the free space status of the host memory 5 (S6) based on the recognition result from the memory status recognition section 342, and if the host memory 5 is empty (S6, Y) the function (method) to copy communications data to the host memory 5 is employed (S7). In other words, the communications method instruction section 343 sets the function to copy communications data to the host memory 5 in the communications method setting sections 321 and communications method setting section 331, and the communications method execution sections 322 and communications method execution section 332 execute that function. While not shown in the figures, when data is copied to the host memory 5, the communications method selection and execution section evaluates the status of the NIC memory 22, and whether or not output directly the network is possible, at the prescribed intervals, and executes methods (1) or (2). On the other hand, when (4) no free space is available in the NIC memory (S6, N) or the host memory 5, the communications method instruction section sets the function to wait for the process in the user program execution section in the communications method setting section, and the communications method execution section executes it (S8) until free space becomes available, or until direct output to the network using the NIC hardware is possible, in other words, until the afore-mentioned functions (1) through (3) can be employed.

B) At transmission: Data length not equal to or greater than the prescribed length.

The afore-mentioned has described a number of functions for communications using NIC hardware (NIC 2) when communications data length is equal to or greater than the prescribed length. However, when communications data length is not equal to or greater than the prescribed length (S1, N), in place of data communications with the afore-mentioned NIC hardware, the performance and status recognition section 34 outputs an instruction to the communications method setting sections 321 and 331 of the communications control section 32 and NIC control section 33 respectively to conduct communications (transmission) using the host processor (host CPU 4). In this case, functions implemented by the host processor (host CPU 4) are the same as the [functions] operation of the afore-mentioned NIC hardware.

In other words, when (1) data length is not equal to or greater than the prescribed length, and the NIC memory 22 is empty (S9,Y), the performance and status recognition section 34 (communications method instruction section 343) uses the host processor (CPU 4) to employ the function (method) to transfer data in, for example, the host memory 5 or the hard disk drive 7, and related to the communications request, to the NIC memory 22, and this method is set in the communications method setting sections 321 and 331 of the communications control section 32 and NIC control section 33 respectively, and the communications method execution sections 322 and 332 execute that communications method (S10). On the other hand, when (2) no free space is available in the NIC memory 22 for the data length (S9, N), and data related to that communication is, for example, in the host memory 5 and can be output directly to the network (S11, Y), the host processor (CPU 4) is used and the function to output directly from the interface to the network may be employed (S12). Furthermore, when (3) no free space is available in the NIC memory, or when the afore-mentioned function is employed, and the output line to the network is in use and the like, and direct output to the network is not possible (S11, N), the communications method instruction section 343 evaluates the free space status of the host memory 5 based on the recognition result from the memory status recognition section 342, and if the host memory 5 is empty (S13, Y) the method to copy data to the host memory 5 is employed is data related to communication is on, for example, the hard disk drive 7. In other words, the communications method instruction section communications method instruction section 343 sets the function to copy communications data to the host memory 5 in the communications method setting sections 321 and communications method setting section communications method setting section 331, and the communications method execution section executes that function (S14). When data is copied to the host memory 5, the communications method instruction section 343 evaluates the status of the NIC memory 22, and whether or not output directly the network is possible, at the prescribed intervals, and executes functions (1) or (2). On the other hand, when (4) no free space is available in the NIC memory 22 or the host memory 7 (S13, N), the communications method instruction section 343 sets the function to wait for the process in the user program execution section in the communications method setting section and the communications method execution section executes it (S15) until free space becomes available, or until direct output to the network using the NIC hardware is possible, in other words, until the afore-mentioned functions (1) through (3) can be employed.

C) At reception: Data length equal to or greater than the prescribed length.

When a receive data request is received from the user process (user program execution section 31), the communications data information acquisition section 35 acquires information on the data related to the receive request. The hardware performance recognition section hardware performance recognition section 341 evaluates the data length acquired from the communications data information acquisition section 35, and outputs the hardware performance for the data length to the communications method instruction section 343. Furthermore, the memory status recognition section 342 recognizes the memory status based on the free space of the host memory 5 and the free space of the NIC memory 22. The free space status is then output to the communications method instruction section 343.

As shown in FIG. 8, (1) when data length is equal to or greater than the prescribed length (S21, Y) and the NIC memory 22 is empty (S22, Y), the communications method instruction section 343 uses the NIC hardware to employ the function to transfer data related to the communications request to the NIC memory 22, and enters settings appropriate for this method in the communications method setting sections 321 and 331 of the communications control section 32 and NIC control section 33 respectively, and the communications method execution sections 322 and 332 execute the set communications method (S23). On the other hand, when (2) no free space is available for the data length in the NIC memory 22 (S22, N), the communications method instruction section 343 evaluates the free space status of the host memory 5 based on the recognition result from the memory status recognition section 342, and if the host memory 5 is empty (S24, Y) the method to copy that data to the host memory 5 without transmission to the NIC memory 22 is employed. In other words, the communications method instruction section 343 sets the function to copy communications data to the host memory 5 in the communications method setting sections 321 and 331, and the communications method execution sections 322 and 332 execute this method (S25). On the other hand, when (4) no free space is available in the NIC memory 22 or the host memory 5 (S24, N), the communications method instruction section 343 sets the function to wait for the process in the user program execution section 31 in the communications method setting sections 321 and 331 and the communications method execution sections 322 and 332 execute it (S26) until free space becomes available, or until reception is possible, in other words, until the afore-mentioned functions (1) through (3) can be employed.

D) At reception: Data length not equal to or greater than the prescribed length.

When data length is not equal to or greater than the prescribed length, the performance and status recognition section 34 conducts the afore-mentioned data communications (transmission) operation with the host processor (host CPU 4) in place of the NIC hardware.

In other words, when data length is not equal to or greater than the prescribed length (S21, N), and the NIC memory 22 is empty (S27, Y), the function (method) to transfer data related to the communications request to the NIC memory 22 using the host processor (CPU 4) is employed, and settings appropriate for this method are entered in the communications method setting sections 321 and 331 of the communications control section 32 and NIC control section 33 respectively, and the communications method execution sections 322 and 332 execute the set communications method (S28). On the other hand, when no free space is available for the data length in the NIC memory 22 (S27, N), the communications method instruction section 343 evaluates the free space status of the host memory 5 based on the recognition result from the memory status recognition section 342, and if the host memory 5 is empty (S29, Y) the method to copy that data to the host memory 5 using the host CPU 4 is employed. In other words, the communications method instruction section 343 sets the function to copy communications data to the host memory 5 in the communications method setting sections 321 and 331, and the communications method execution sections 322 and 332 execute this method (S30). On the other hand, when no free space is available in the NIC memory 22 or the host memory 5 (S29, N), the communications method instruction section 343 sets the function to wait for the process in the user program execution section 31 in the communications method setting sections 321 and 331 and the communications method execution sections 322 and 332 execute it (S31) until free space becomes available, or until reception is possible.

Second Embodiment

When data length is equal to or greater than the prescribed length, or when it is not equal to or greater than the prescribed length and no free space is available in the NIC memory or host memory in (2), (3), and (4) and the like in the afore-mentioned A) through C), the memory status recognition section can estimate the time for free space to become available in these memories based on communications data acquired from the communications data information acquisition section, and ensure that the user process waits for the estimated time. This estimated time is determined by, for example, storing the time from the state of no free space available in the NIC memory to the prescribed volume of free space becoming available based on empirical values, or by evaluating the rate at which free space becomes available and estimating the time for the volume of free space necessary to store the prescribed data. The same estimation can be made for the host memory, and the user process delayed. When free space becomes available, transfer processing is executed in response to the steps (2), (3), and (4).

Third Embodiment

Figure 9:
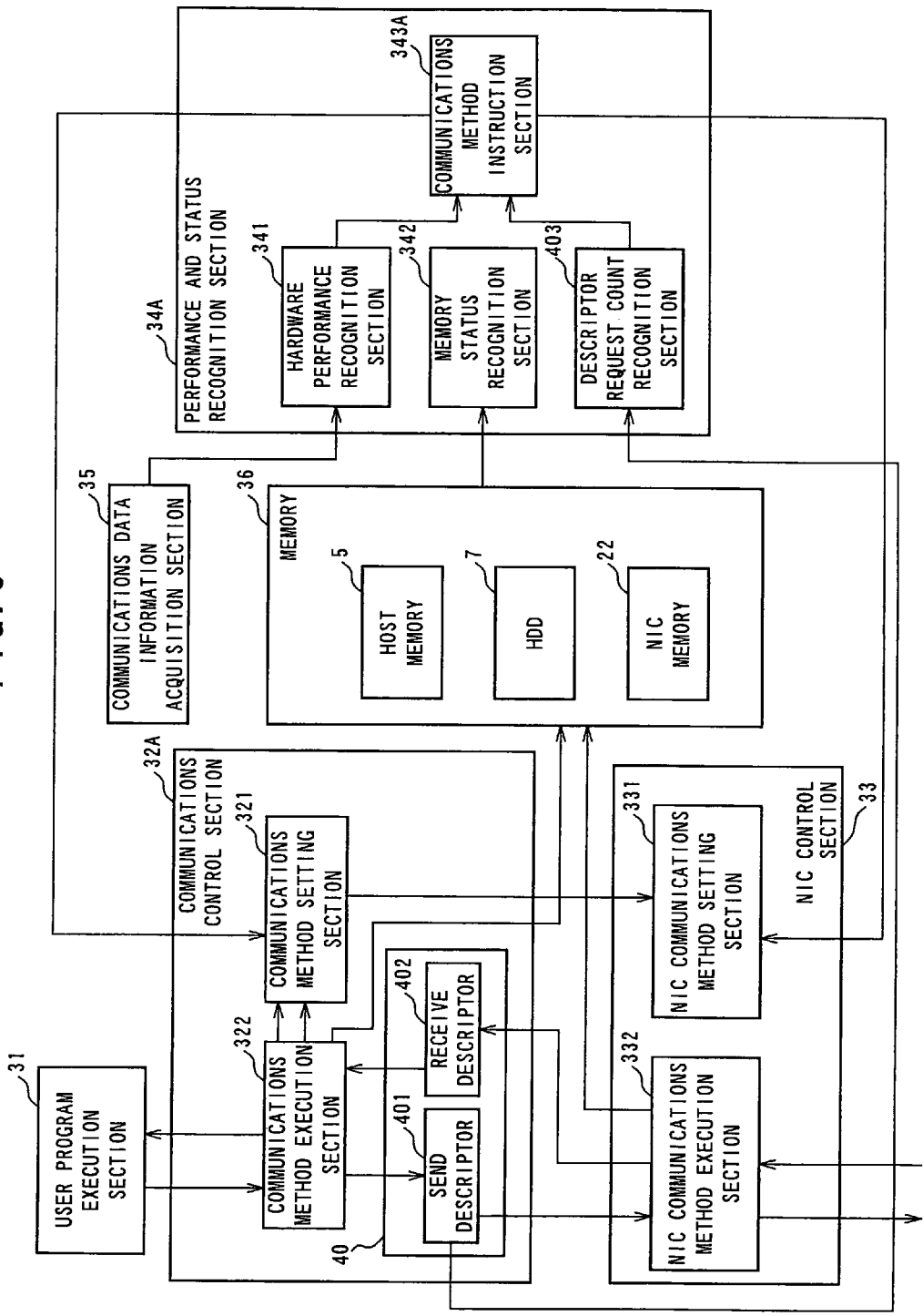
FIG. 9 is a function block diagram of the third embodiment of the present invention.

The third embodiment describes handling when a communications method using a send-receive descriptor is used. When the number of requests in the send-receive descriptor is equal to or greater than the prescribed number, a plurality are transferred together to reduce the number of starts by the NIC hardware, and to reduce the starting overhead. Since the starting overhead for the NIC hardware is considerable, reduction of the number of starts has a significant effect on raising the efficiency of communication. FIG. 9 is a function block diagram for the third embodiment. Here, the same symbols are applied to the same objects as in FIG. 4, and a description is therefore omitted. In the third embodiment, a send-receive descriptor 40 (401, 402) is provided in the communications control section 32A, and a send-receive descriptor request count recognition section 403 is provided in the performance and status recognition section 34A. When a communications request is [received], the number of descriptors is evaluated based on the send-receive descriptor 40 information, and if [this number] is equal to or greater than the prescribed number, a plurality are transferred together, and transferred individually if [this number] is not equal to or greater than the prescribed number. In other words, when transmitting, if the number of send-receive descriptors is equal to or greater than the prescribed number, data is transferred together to the NIC memory 22, or the communications method instruction section 343A enters the method in the communications method setting sections 321 and 331 of the communications control section 32A and NIC control section 33A respectively, and the communications method execution sections 322 and 332 execute it. If the number of send-receive descriptors is not equal to or greater than the prescribed number, the afore-mentioned processing is [executed] individually. If the length of the sent data is equal to or greater than the prescribed length, the NIC hardware conducts transfer processing in accordance with the first embodiment. Furthermore, when the data length is not equal to or greater than the prescribed length, the host processor (CPU 4) conducts transfer processing. Furthermore, reception is similar in that, when the number of receive descriptors is equal to or greater than the prescribed number, data is transferred together to the host memory 5 and hard disk drive 7. When the number of send descriptors is not equal to or greater than the prescribed number, the afore-mentioned processing is conducted individually.

FIG. 10 is a flowchart showing operation in the case of transmission. According to this [flowchart], when the number of descriptor requests is equal to or greater than the prescribed number (S41, Y), all data lengths are evaluated to determine whether or not they are equal to or greater than the prescribed length. If equal to or greater than the prescribed length (S42, Y), [data] is transferred together by the NIC hardware (S43). When all data lengths are not equal to or greater than the prescribed length (S42, N), all data is sent together by the host CPU4 to, for example, the NIC memory 22 (S44).

On the other hand, when the number of descriptor requests is not equal to or greater than the prescribed number (S41, N), data is transferred individually. In this case, data length is evaluated for each data, and when equal to or greater than the prescribed length, [the data is] transferred by the NIC hardware. When data length is not equal to or greater than the prescribed length, [the data is] transferred by the network host CPU 4 (S45).

The above has described the various embodiments of the present invention, however the present invention is not restricted to the afore-mentioned embodiments, and may naturally be applied provided it does not deviate from the essential points of the present invention.

INDUSTRIAL APPLICABILITY

As described above, according to the present invention, a communications method can be selected automatically in response to a variety of computer environments, demonstrating an ability to obtain a system of data communication, a method of data communication, and a program for data communication improving speed of communication and speed of applications.

What is claimed is:

1. A computer conducting network communications, said computer comprising:
a host processor as a host; and
a network interface card (NIC) communication with the host processor; and
wherein the host comprises a memory used as a data buffer and the memory stores a program, the host executing the program to perform operations of:
recognizing at least one of performance and status related to data communications between the host and the NIC,
selecting and executing at least one of a plurality of differing communications methods based on the recognizing of the performance and status related to the data communication between the host and the NIC, and
using a descriptor of the data buffer for transferring data between the NIC and the host by including a number of communication requests in said data buffer descriptor as a status related to said data communications, and when said number of communication requests is recognized as equal to or greater than a prescribed number by said recognizing of the performance and status, said selecting and executing transfers data of a plurality of the communication requests in a batch of communication requests with the NIC.

2. The computer according to claim 1, wherein said selecting and executing transfers data subject to a communications request directly to a memory of the NIC when a free space status of the NIC memory related to the data subject to said communications request is included as a status related to said data communications, and the free space is recognized as available in the NIC memory by said recognizing of the performance and status related to the data communication between the host and the NIC.

3. The computer as set forth in claim 2, wherein said selecting and executing sets execution of processing of a communications request in a wait state when a free space status of the host memory, and the free space status of the NIC memory, for data subject to the communications request are included as statuses related to said data communications, and no free space is recognized in the NIC memory, and no free space is recognized in the host memory, by said recognizing of the performance and status related to the data communication between the host and the NIC.

4. The computer according to claim 1, wherein said selecting and executing copies data subject to a communications request to the host memory when a free space status of said host memory, and a free space status of a memory of the NIC for data subject to said communications request are included as statuses related to said data communications, and no free space is recognized in the NIC memory, and the free space is recognized as available in said host memory, by said recognizing of the performance and status related to the data communication between the host and the NIC.

5. The computer according to claim 1, wherein said recognizing of the performance and status, related to the data communication between the host and the NIC, estimates a time for free space to become available, and sets a processing of communications request in a wait state for the estimated time until the free space becomes available when a free space status of a memory of the NIC for data subject to a communications request is included as a status related to said data communications, and no free space is recognized in the NIC memory by said recognizing of the performance and status related to the data communication between the host and the NIC.

6. The computer as set forth in claim 1 wherein said selecting and executing transfers the data of the communication requests one communication request at a time with the NIC when said number of communication requests is recognized as not equal to or greater than a prescribed number by said recognizing of the performance and status.

* * * * *

UNITED STATES PATENT AND TRADEMARK OFFICE
CERTIFICATE OF CORRECTION

PATENT NO.         : 7,529,261 B2
APPLICATION NO. : 11/120963
DATED                  : May 5, 2009
INVENTOR(S)       : Shinji Sumimoto It is certified that error appears in the above-identified patent and that said Letters Patent is hereby corrected as shown below:

Column 10, Line 47, change "(NIC)" to --(NIC) in--.

Column 11, Line 27, change "NIC" to --NIC,--.

Signed and Sealed this

First Day of September, 2009

David J. Kappos
*Director of the United States Patent and Trademark Office*